Nov. 7, 1967     J. GOLDSMITH ET AL     3,351,870

PULSED GAS LASER

Filed April 2, 1963     3 Sheets-Sheet 3

INVENTORS
JOSEPH GOLDSMITH
WILLIAM H. McMAHAN
EARL H. BYERLY

ATTORNEY

3,351,870
PULSED GAS LASER

Joseph Goldsmith, Maitland, William H. McMahan, Orlando, and Earl H. Byerly, Maitland, Fla., assignors to Martin-Marietta Corporation, Middle River, Md., a corporation of Maryland
Filed Apr. 2, 1963, Ser. No. 269,940
8 Claims. (Cl. 331—94.5)

This invention relates to a time selective pulse technique for gas laser operation, and more particularly to a novel means and method for selectively exciting a desired energy level within a gas laser tube in order to produce stimulated emission whose peak power output level is substantially greater than the continuous power output level previously achieved by the operation of gas lasers in the conventional continuous wave mole.

The continuous mode operation of prior art gas lasers has involved the stimulated emission derived from a gas mixture excited by a continuous radio frequency generator suitably coupled to the gas laser tube by means of external electrodes, or else excited by means of a direct current applied between two internal electrodes attached to the gas laser tube. It is significant to note that in either instance, the stimulated emission is limited to a fixed level. This is because even though the impedance of a gas tube initially is high, as the electron density increases due to the applied field and collision processes, the current through the tube increases, thus causing the impedance to become lower, and in turn lowering the applied field until an equilibrium condition exists. This is sufficient to maintain a population of excited states in a gas such as helium, which in turn can transfer energy to another gas such as neon so as to provide the stimulated emission necesary to produce laser action, but the power output resulting from this type of operation is limited to a fixed level by resonance trapping, depopulation of preferred levels by inelastic collision, and population of undesired levels.

Helium-neon gas lasers have been extensively investigated, and during such it has been discovered that one of the major factors limiting the power output of a device of this type operated in a continuous mode is directly connected with the population of the $1s$ and $2p$ levels of neon. Under continuous wave operation, the quenching of the $1s$ metastable levels is accomplished through ionizing collisions with the container walls. Since the cross section for electron excitation of the transition from the $1s$ to the $2p$ levels is larger than that for the $1s$ to $2s$ transitions, and since much of the orange-yellow light emitted in the $2p$–$1s$ transitions is reabsorbed by neon atoms in the $1s$ levels, population of the $1s$ levels produces an effective increase in the lifetime of the laser transition terminal state. Population of the $1s$ neon metastable also reduces the number of ground state neon ions available for collision excitation by He $2^3S$ metastables.

As will be described at length hereinafter, the present invention avoids difficulties inherent in conventional laser operation, and provides an excitation configuration which eliminates or minimizes the restrictions on peak power output imposed by the conventional mode of gas laser operation. By applying the pump energy in the form of high voltage repetitive pulses having fast rise time, short width and relatively long pulse repetition rate, adverse effects are minimized and high peak power output achieved.

A number of gaseous optical masers have in the past been utilized as oscillators, utilizing a Fabry-Perot interferometer filled with a gas which is excited in such a way as to be capable of amplifying light. Amplification of course arises by stimulated emission of atoms in the upper of two optically connected energy levels, and the amplification process is such as to preserve the frequency, phase and direction of propagation. The interferometer in such instances serves as a multimode resonant cavity which supplies the positive feedback required to produce oscillation. If the gain in the medium can be made large enough to compensate for losses, light emitted spontaneously in the interferometer mode will build up until the rate at which energy leaks out of the interferometer saturates at a value determined by the supply of excited atoms and other parameters of the system. Since the threshold requirement generally requires the use of an interferometer in which the frequency widths of the cavity resonances are small compared to the width of the amplifying transition, the frequency characteristics of the laser are determined to first order by the cavity properties. Thus, the oscillating frequency is directly dependent upon the cavity length, and the line narrowing which results from the coherent amplification process starts out about the passive cavity width.

The divergence characteristics of the external laser beam are of course determined to first order by diffraction effects on the energy distribution in the cavity mode and by the radius of curvature of the interferometer mirrors. It should be noted that steady state oscillation can occur when the single pass gain just equals the single pass loss, or more precisely, because of spontaneous emission in the mode, when the gain is just slightly less than the loss.

Prior to the analysis by Fox and Li and others of the properties of the normal modes of plane-parallel, confocal, and intermediate type Fabry-Perot interferometers, it was not entirely obvious that normal modes would even exist in these open walled structures, and the normal modes which do occur have considerably different properties from those customarily associated with the resonances in passive Fabry-Perot interferometers. A normal mode consists of a field distribution over the aperture of the interferometer, which reproduces itself in successive transits between the mirrors. Due to diffraction effects during transit, the field in the outer portion of the aperture is more greatly attenuated than the field at the center. Therefore, uniform plane waves cannot be regarded as normal modes of a plane-parallel interferometer and calculations of the diffraction loss made from the plane wave point of view can be enormously over-estimated for certain choices of geometry. The diffraction problem was first worked out in the plane-parallel case using a reiterative numerical procedure by Fox and Li, and the eigenvalues for the corresponding integral equation have since been solved for different choices of geometry using that and other approximate methods. The results show the existence of a whole series of transverse electromagnetic modes possessing even and odd symmetry about the interferometer axis, and solutions have been obtained for the loss, resonant frequencies and field distributions in a variety of different cases.

For the plane-parallel limit, the dominant ($TEM_{00}$) modes are those possessing even radial symmetry and consist of an infinite number of uniformly spaced resonant frequencies given by the equation $$\nu_m = m(c/2b) \tag{1}$$

where $m$ is an integer in the order of $10^6$ for gas masers, $c$ is the velocity of light, and $b$ the plate separation. For a 1-$m$ Fabry-Perot, $c/2b=150$ mc./s. Equation 1 corresponds to the familiar Fabry-Perot condition that the plate separation be a half-integral multiple of the wavelength. The next modes of importance ($TEM_{10}$) are those possessing odd radial symmetry. The first odd-symmetric modes are also evenly spaced by $c/2b$, but fall higher in frequency than the dominant modes by amounts ($\cong 1$ mc./s.) that are small compared to $c/2b$ and depend on the dimensions. The existence of these two sets of radial modes was verified by photomixing experiments conducted with the first helium-neon optical maser, as set forth in Physical Review Letters, Volume 6, Number 3 in an article by Javan, Bennett and Herriott entitled "Population Inversion and Continuous Optical Maser Oscillation in a Gas Discharge Containing a He-Ne Mixture."

In the confocal limit, the dominant modes are separated by $c/4b$, or half the mode spacing given by Eq. 1. In addition, there is a high order of degeneracy in the numerous low-loss modes for resonators of this type which is removed as the mirror separation is varied from the confocal spacing. For these reasons, the confocal geometry is less obviously suited for precise frequency control than the plane-parallel case. Experimental studies of the frequency separation of dominant modes in the confocal and near confocal case have been reported by Rigrod et al.

The first helium-neon maser used by Javan et al. as reported in the previously cited article serves to illustrate the general excitation methods used, as well as some of the problems characteristic of plane-parallel masers having internal mirrors. The components in the active portion of such a maser are compatible with standard ultra-high vacuum technique, with the exception that the high-reflectance films require proper handling and rather modest bakeout temperatures (typically $\cong 150°$ C. for 24 hr.) are recommended. The condensation of a droplet of water vapor on these films prior to evacuation or expose are to atmospheric pressure after bakeout during refilling operations is usually fatal. Protection against the latter is obtained by leaving a bakeout valve permanently attached to the maser, which is opened only into vacuum. Demountable gold "O-ring" seals can be utilized to provide a convenient means of changing the plates.

The discharge tube may be baked differentially at much higher temperatures than the rest of the maser and the use of quartz minimizes a source of gas contamination through puncture of trapped air filaments in the tubing walls by the discharge. The discharge tube is mechanically isolated from the alignment structure by the use of bellows at each end. The impurity levels in commercially available reagent grade gases are generally tolerable and the main source of contamination occurs through out-gassing over prolonged periods of time. This problem is not as severe as might be expected due to the self-cleaning nature of the discharge, and may be completely eliminated in the noble gas masers through the use of a side arm containing getter material such as barium.

For nonparallel mirror alignment, the loss of course is much higher. It was found for example that the loss in this maser increased by about 1%/sec. of angular disalignment. In anticipation of these problems, the main emphasis in the mechanical design is placed on obtaining two finely controlled, orthogonal and independent adjustments of the plate angles. These adjustments can be accomplished by the use of spring-decoupled micrometers to rotate the two end-plate assemblies about orthogonal hinges. Initial alignment may be easily obtained with such a design.

The first successful operation of a confocal maser with external mirrors was reported by Rigrod et al. using the strong 1.1523-$\mu$ transition in the helium-neon system. The light beam was allowed to pass through flat windows whose surface normals were placed at the Brewster angle with respect to the beam axis. This arrangement eliminates Fresnel reflection loss for radiation polarized in the plane of incidence and prevents oscillation in the polarization normal to the plane of incidence. The resultant losses in window transmission come entirely from scattering by imperfections or absorption in the glass and with reasonable care may be kept below $\cong \frac{1}{2}\%$. The tolerances ($\cong \pm 3°$) in setting the window at the Brewster angle are quite coarse and easily met. Also, for most borosilicate glass, the variation of the Brewster angle with wavelength is well within the adjustment tolerance over a considerable range. In most cases, absorption losses begin to dominate before appreciable changes are required in the window alignment. Hence, the region from the visible to a little over $2\mu$ may be easily covered with one adjustment of the windows. The confocal system permits the use of rather low quality windows ($\cong \frac{1}{4}$ wavelength) and the criterion for mirror alignment is less severe than the plane-parallel case by about two orders of magnitude in the plate angles. Masers of this type have been extremely valuable for investigating new gas systems since the use of external mirrors eliminates the difficulties involved in baking out high reflectance dielectric films, permits rapid change of mirrors for covering different wavelengths regions, and also makes it easier to deal with chemically active gases.

Various equivalent ways exist for formulating the threshold requirement for oscillation in the system. Schawlow and Townes first derived this condition by requiring that the power produced by stimulated emission in the cavity mode equal the total rate at which energy decayed, this being reported in a 1958 paper published in Physical Review, Volume 112, Number 6, entitled "Infrared and Optical Masers." The result may also, of course, be obtained by equating the gain and loss per unit path length. This second approach has merit in the case of gas systems since the dependence of both absorption and stimulated emission on line shape have been worked out in great detail by classical methods. Although absorption was always taken to be dominant in the older treatment of the problem, the effects of stimulated emission were nevertheless included. Hence, many useful results may be carried over to optical maser problems merely by multiplying the appropriate classical expressions by $(-1)$.

Although the selection rules for electron impact are roughly similar to those for optical pumping, this method comprises the most general approach yet found for obtaining population inversions in gas systems. The large degree of general applicability arises because the electron excitation cross sections are very broadly resonant ($\Delta E \cong 1$ to 100 ev.) in the energy difference above threshold. The class of levels that may be excited is roughly the same as in the other instance. For example, the cross section for exciting the $m$th level from the ground state is given by $$Q_{mo} \tilde{\alpha} |\int e^{i\mathbf{K}\cdot\mathbf{r}} \psi_m{}^* \psi_o d\mathbf{r}|^2 \qquad (2)$$

from the Born approximation, where K is the change in the propagation vector for the incident electron and $\psi\, m, \psi\, o$ are the wave functions for the $m$th excited state and the ground state, respectively. The first non-vanishing term in the immediately preceding equation is just proportional to the electric-dipole transition probability between the ground state and the excited state of the atom. Hence, the largest cross sections are obtained for optically allowed transitions and $$Q_{mo} \tilde{\alpha} A_{mo} \qquad (3)$$

Latter approximation only holds with high accuracy in the limit that the electron energy is well above threshold. However, it turns out that even close to threshold the ratios of cross sections are still approximately proportional to the ratios of the Einstein A-coefficients for levels of the same multiplicity. Hence, a level which has a large transition probability for radiation to the ground state of the atom also has a proportionally large cross section for excitation by electron impact and vice versa. For this reason, schemes such as the pure helium case proposed by Sanders which are based on electron excitation in single-component systems and in which fast relaxation of the lower maser level occurs by radiation to the ground state, are generally doomed to failure. That is, nature is just sufficiently perverse to make the constants of proportionality such that absorption will be obtained on the "maser" transition. An addition failing occurs in systems of this sort due to resonance trapping in the transition to the ground state at pressures which are large enough to support a discharge.

The opposite limit—where the lower maser level acquires its fast decay by radiation to a set of levels other than the ground state and where the upper maser level is optically connected to the ground state—is, of course, ideally suited for excitation by electron impact and has been used successfully in masers utilizing pure neon, argon, krypton, and xenon. Because of electron exchange collisions, the cross sections for exciting states with total electron spin differing by ½ from that for the ground state can also be quite large at near-threshold energies. For this reason a fair number of states in the same configuration with an "optically connected" level may also be excited with reasonable probability by electron impact in gas discharge systems.

Continuous optical maser oscillation was first obtained by Javan et al. on the five infrared transitions of neon listed hereinafter as Table I. The amplifying medium consisted of an RF discharge containing a mixture of helium and neon. A number of pertinent energy levels of helium and neon are shown hereinafter in FIGURE 3, along with a schematic indication of the excitation mechanisms actually involved.

Javan further proposed the use of excitation transfer in collisions of the type

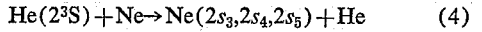

$$\text{He}(2^3S) + \text{Ne} \rightarrow \text{Ne}(2s_3, 2s_4, 2s_5) + \text{He} \qquad (4)$$

as a means of populating the $2s_{3,4,5}$ levels in helium-neon mixtures and, hence, for obtaining gain on the 0.949, 0.967, and $0.899\mu$ ($2s_3$–$2p_{10}$) transitions of neon. Although a high degree of transparency has since been obtained on these three transitions, they do not belong to the large group of transitions in the helium-neon system on which oscillation or other direct proof of gain has been produced so far. Because of the large gap ($\cong 1400$ cm.$^{-1}$) between the $2p_9$ and $2p_{10}$ levels, apparently an excessive population of the $2p_{10}$ level could result from the combined effects of $2p$–$1s$ resonance trapping and excitation transfer in neon-neon collisions. This type of process may explain the failure to date of all attempts to obtain oscillation on any neon transitions terminating in the $2p_{10}$.

As Javan pointed out, there is considerable practical advantage in making use of a reaction such as (4) above. Since the He($2^3$S) level is the first excited state of helium, the many mechanisms by which it can be formed lead to an exceptionally high effective excitation cross section. Further, its metastable character permits these large effective formation rates to be transferred selectively through such a reaction to an excited impurity level. This type of selective enhancement process was, of course, well known to optical spectroscopists and, for example had been used previously with considerable success in certain types of gas scintillation counters. Although no direct studies of this reaction itself had previously been conducted, it was at least known that an anomalous enhancement of the visible ($2p$–$1s$) transitions of neon occurred in highly pure helium samples, and Javan's proposal therefore appeared quite plausible. There does exist a minimal requirement on the cross section for the reaction, however: the cross section must be large enough so that the impurity partial pressure required for the reaction to dominate over normal volume loss for the metastable does not appreciably lower the mean electron energy. The initial preference for the $2s_{3,4,5}$ arose both because of the expected importance of reactions (c) and (d) at high pressures and because the reaction

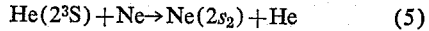

$$\text{He}(2^3S) + \text{Ne} \rightarrow \text{Ne}(2s_2) + \text{He} \qquad (5)$$

violates the conservation of total electron spin. That is, the $2s_2$ corresponds to a $^1P_1$ level, whereas the $2s_{3,4,5}$ corresponds to $^3P_{0,1,2}$ levels, respectively, in LS-notation. Hence, although the $2s_2$ was the only neon level falling $\cong kT$ below the He($2^3$S) and consequently the only level for which a really large transfer cross section could be expected on the basis of the energetic resonance discrepancy, reaction (5) could not be expected to have a very high cross section because of the Wigner spin conservation rule. The fact that reaction (5) does actually occur to a significant degree most probably has its explanation in the failure of LS-coupling in the Ne($2s$) levels.

The first experimental studies on the pure neon and helium-neon systems were conducted by Javan and Bennett. Their results indicated that the second-order effects of the neon metastables would be so devastating that sufficient gain to produce oscillation would be impossible to obtain in the pure gas system. As will be noted, the system in accordance with the present invention does not use this phenomena, since pulsing takes place during electron lifetimes.

A pulsed gas laser for producing a pulsed output of coherent electro-magnetic energy in accordance with this invention comprises an envelope containing a lasable gas, an electron-emitting cathode disposed in said envelope and arranged to inject electrons into the gas, and partially reflective surfaces aligned so as to provide an optically resonant cavity in the envelope. Means are provided for supplying high voltage pulses to the cathode, of short duration and having a fast rise time, thereby to produce a free electron density in the gas. The electrons accelerated by the electric field produced in the envelope by the high voltage pulses elevates a significantly large number of atoms of the gas to the specific high energy level from which the energy may decay so as to bring about a radiative transition to a lower energy level. Stimulated emission is thus produced, which impinges upon the partially reflecting surfaces so as to be reflected back and forth through the envelope to bring about additional radiative emission, while substantially minimizing the population of undesired energy levels and other adverse phenomena, ultimately built up to an intensity sufficient to escape from the said partially reflective surfaces as a coherent beam of electro magnetic energy.

For the purposes of this invention, a lasable gas may be defined as any gas or combination of gases at a suitable pressure, which when introduced into the gas envelope of a gas maser can be stimulated by direct current, radio frequency energy, high voltage pulses or the like so as to produce stimulated emission of radiation with the resultant emission of a coherent beam of electro-optical radiation therefrom. The properties of such gases are as follows:

(1) Must have finite measurable lifetime at at least one level.

(2) At least this level must be capable of being populated at a higher rate than some other level between it and the ground state.

(3) The transition from this level must be radiative under the existing conditions.

(4) This radiative transition must be sufficiently narrow such that further narrowing can be produced by induced emission at this line.

It is an object of this invention to achieve higher gain and thus higher peak power output in a gas laser resulting from the deliberate injection of electrons into the gas envelope, thereby causing less of the gas to be ionized, terminal states for laser transitions not to be primarily excited, undesirable metastable states not populated, and resonance trapping reduced to a minimum.

The laser in accordance with this invention may be a helium neon laser in which population inversions are achieved between neon levels by means of excitation transfer from the metastable He($2^3$S) to the $2s$ levels of neon. In one system employing the neon transition $2s_2$–$2p_4$, only 2 milliwatts of CW power were produced, whereas when the same system was pulsed in accordance with this invention, peak power in excess of 100 milliwatts were delivered.

As will be understood, the gain at the transition from the $2s_2$ level to the $2p_4$ level of neon depends upon the relative populations of the two levels. For any specific gain requirements of a resonant cavity, there is a requirement of a minimum ratio of the population of the upper state to that of the lower state. One manner of obtaining this ratio is by increasing the population in the upper level without disturbing that of the lower level, and the other manner is by decreasing the population of the lower level without disturbing the population of the upper level.

The pulsed gas laser operation in accordance with this invention results in approximately the same population of the upper level as is achieved in the normal continuous wave laser, with the increase in the population ratio obtained in accordance with this invention being achieved by operating the device in such a manner that the population of the lower or terminal state of the laser transition is advantageously less than that resulting from continuous wave laser operation.

Such desired lower population of the $2p_4$ level of neon is achieved by operating under transient conditions, in accordance with which laser action is produced before population of the $2p_4$ level is significantly established. The population of the $2p_4$ level is primarily controlled by the population of the $1s$ level, so in reality, laser action is being produced before significant population takes place in the $1s$ metastable level. Under Boltzmann distribution of populations present in an unexcited gas at room temperature, the $1s$ and $21$ levels are not populated, for the population of these levels is produced by the actions of the electrical discharge. When electrical discharge begins in the helium-neon mixture, the $2s_2$ level is populated earlier than the $2p_4$ level and the $1s$ metastable level, and it is during this short period of time between the populations of the $2s_2$ level and the subsequent population of the $2p_4$ and $1s$ levels that laser action is produced. In other words, the transient phenomena which enhances the pulse laser action occurs under very low conditions of excitation, in contrast with prior art laser tube excitation by RF discharge or the like wherein the population of the $2s_2$ level is so low that a significant increase in inversion does not occur.

In order to obtain the desired high intensity of excitation and a high population of the $2s_2$ level under transient conditions, a large number of electrons are in accordance with this invention injection from a cathode into the gas, which electrons are forced down the laser tube under the influence of a high electric field, such as 320 volts/cm. In this way, advantage is taken of the transient phenomena which takes place at the onset of laser action in order to obtain high inversion and subsequent large output powers.

As to the characteristics of the pulses employed herein, a desirable rapid increase in excitation is produced by a sharp leading edge, which enables rapidly excited specific energy levels to be reached in the gas while allowing the gas to maintain many characteristics it possessed before the arrival of the leading edge of the pulse. Then, by minimizing the length of the pulses to such an extent that its length in microseconds is less than the diffusion time of the electrons under the influences of the applied field from cathode to anode, the total character of the gas does not approach that which would have been present if the pulse duration were longer, for such a degree of excitation would change the character of the gas into that of a white hot plasma. This is to say, the present invention can operate at an excitation level much higher than that of a continuous wave laser, which must not operate at an excitation level which will allow a deleterious condition to be achieved. The length of the pulses utilized in accordance with this invention is therefore seen to be dictated by the length in microseconds of the diffusion time of the electrons under the influence of the applied field from cathode to anode. This distance is directly proportional to the length of the tube and also directly proportional to the ratio of the applied field to the internal gas pressure. For a particular gas, the equation $$t = KL\left(\frac{E}{P}\right) \qquad (6)$$

is applicable, where $t$=transit time, L is the distance between electrodes, E is the electric field in the cavity in volts per centimeter, P is the pressure of the gas in the cavity, and K is an appropriate constant. If pulse lengths greater than the value given by this equation are utilized, deleterious effects will take place on the cathode, and the device will overheat.

Pulse repetition frequency is dictated by the time required for the gas to return to an equilibrium condition near that of the Boltzmann distribution. For a typical gas laser arrangement, the pulse repetition frequency is in the kilocycle range, with satisfactory operation having been confirmed for operation between 1 and 5,000/sec.

An additional advantage is obtained by operating a laser at the high electric field levels used in the pulsed laser. High $E/P$ ratios may be maintained during the pulse, which will give the electrons an average energy more nearly equal to that required for the excitation of the He $2^3S$ excited state. This is to be contrasted with the operation of a CW laser wherein the average energy of the electrons is significantly below that of desired excitation levels, and only a trailing edge of the distribution function of the electrons overlaps the energy spectrum of the levels to be excited.

These and other objects, features, and advantages will be more apparent from a study of the enclosed drawings in which.

Figure 1:
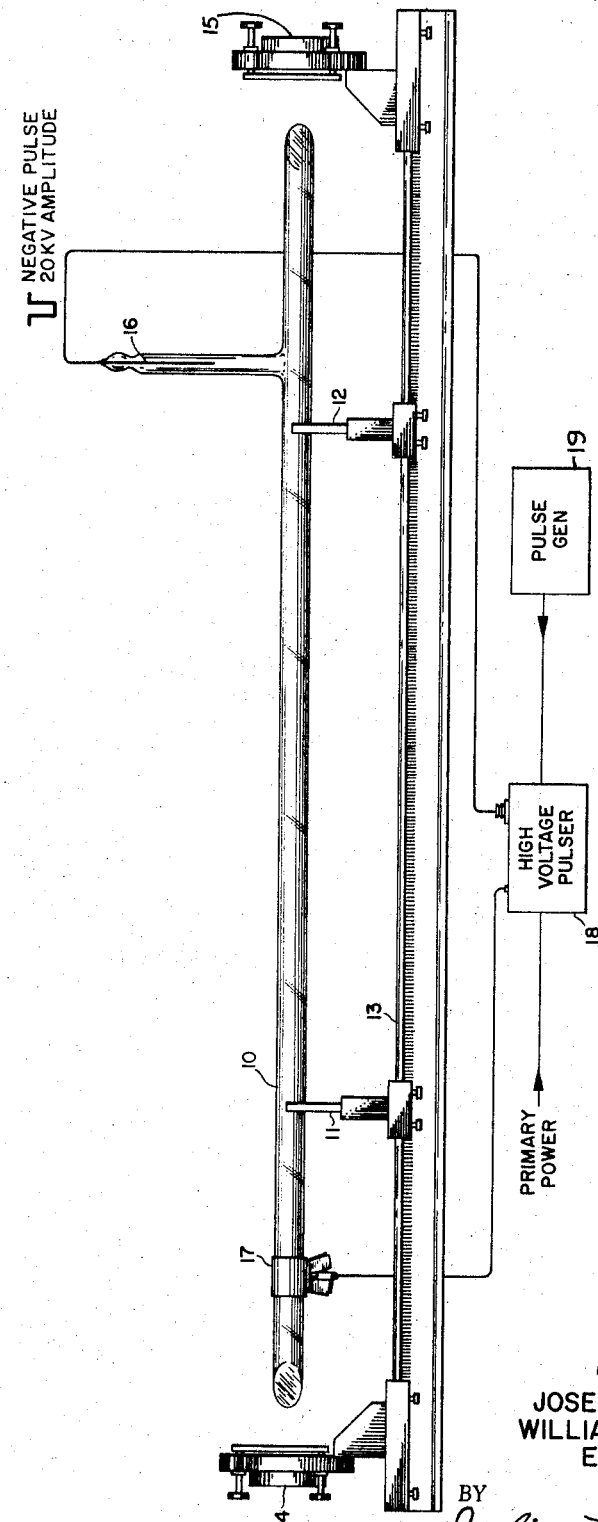
FIGURE 1 is a side elevational view of an exemplary embodiment of the present gas laser, illustrating the cathode to which high voltage pulses are supplied.

Turning to FIGURE 1 of the drawings, a tube or envelope 10 filled with a suitable lasable gas is provided. The gas envelope may be of quartz and a length from several inches to several feet, depending upon the particular gas transition involved and the optical path dimensions or prerequisites that are utilized. As will be seen, the present invention will be described in conjunction with the $2s_2$–$2p_4$ transition of neon, but this in no manner is to be construed as a limitation. Tube 10 is supported by dielectric supports 11 and 12, which are adjustably secured to supporting rail 13. It should be noted that the inner diameter of the tube 10 is not limited in the manner to be associated with continuous wave lasers, this being true because of the rapid inversion techniques employed in accordance with this invention. This is to say, a laser arrangement utilizing a rapid inversion technique taught herein may well possess inner diameters from a fraction of an inch up to several inches. One embodiment of our invention utilized a tube 94 cm. in length, with an internal diameter of 1.5 cm., but this is in no manner to be limiting.

Figure 2:
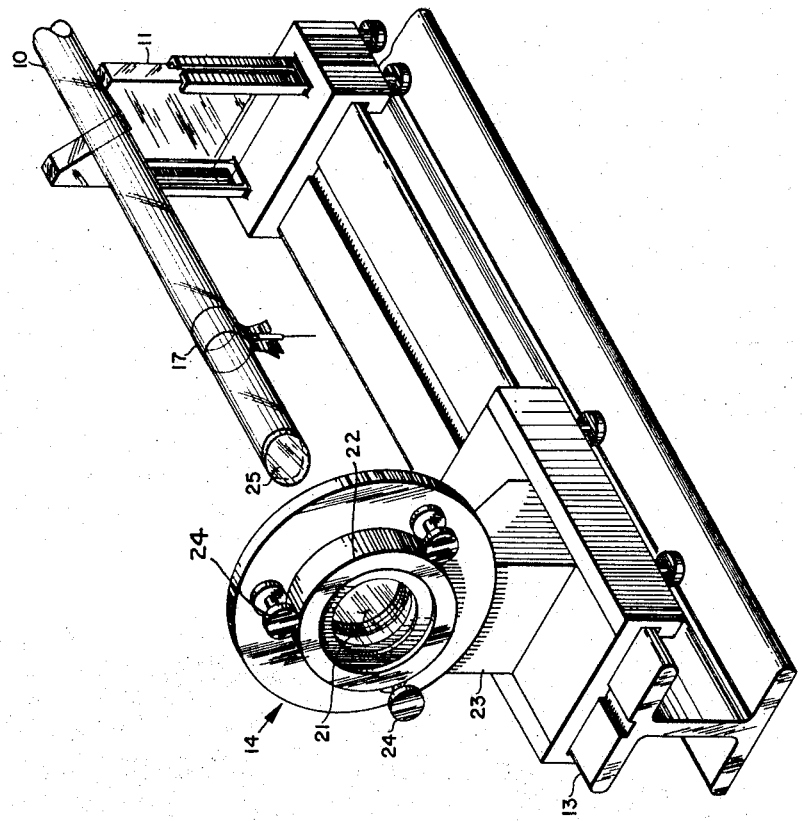
FIGURE 2 is a perspective view to a somewhat larger scale illustrating certain constructional features of this device.

External mirror arrangements 14 and 15 may be employed in accordance with optically resonant cavity requirements, so that an optically resonant cavity will be defined in the envelope 10. As depicted in FIGURE 2, typical mirror arrangement 14 may be noted to include a mirror 21 disposed in a three point suspension mounting ring 22. The thumb screws on the mirror arrangements 14 and 15 enable the respective mirrors to be critically aligned with the longitudinal axis of the tube 10 in order that lasing action can take place. Each mirror is dielectrically coated so as to be highly reflective, and in the aforementioned arrangement, were coated such that peak reflectivity of 99% occurred at 11530 A. Inasmuch as the mirrors are not 100% reflective, however, output bursts of coherent electromagnetic radiation can occur in both directions from the tube 10 at such time as a sufficiently high energy level has been reached.

Alignment of the mirrors and operation of the laser tube are far less critical when the mirrors 21 are confocal mirrors. However, plane-parallel mirrors may also be employed utilizing the same operational principle in a Fabry-Perot configuration if convenience and scientific reasons so indicate.

The length between the mirrors is dictated in the case of confocal mirrors by the arbitrarily chosen radius of curvature of the mirrors. This distance, for best laser operation, is equal to this radius of curvature. Other radii of curvatures could be chosen, however, with the limiting case being plane-parallel reflecting mirrors in which the tube length is now dependent only upon the gain per unit length of the chosen laser transision, and difraction limitations.

The confocal system employed in our invention lases in a narrow portion of the gas at the center of the tube. Due to the higher gain in this portion of the tube, the output of the confocal system under CW operation is not too far below that of the plane parallel system. However, this does not hold for the pulsed system since the pulse process does not continue for a sufficient time to enable diffusion effects to occur.

It should be pointed out, therefore, that the embodiment of this invention utilizing plane parallel mirrors and larger diameter gas tubes is capable of yielding even still large peak power output than the confocal configuration.

Base support members 23 are movable along the rail 13 so the distance each mirror is from its respective end of the tube 10 can be easily adjusted when such is necessary. Brewster plates 25 are typical of the devices utilized at each end of the gas tube envelope 10 in accordance with well known techniques in order to minimize reflection losses. Although in some instances we prefer the use of external mirrors, this also is not to be construed as a limitation, for an internal mirror arrangement may well be utilized within the teachings of this invention.

In accordance with this invention, a cathode 16 is employed in conjunction wtih the envelope 10 so as to supply free electrons to the gas space therein. The cathode is contained in a tubulation located near one end of the envelope 10, with the length of the cathode preferably being shorter than that of the tubulation so that the cathode will not extend into the contour of the main portion of tube 10. The cathode is preferably of tungsten. An anode 17 may be employed near the other end of the tube, but its presence is not of considerable importance inasmuch as leakage paths exist along the envelope, which form a return for the applied electric field. High voltage pulser 18 is utilized to supply high voltage negative pulses to cathode 16, which pulses in accordance with this invention must have a fast rise time, short pulse width, and must have a high kilovolt amplitude. Furthermore, the pulses must have a sufficiently long pulse recurrence period, with all of these characteristics being important in order to satisfy the rapid inversion principle. As will be apparent, the positive side of the high voltage pulser is applied to the anode 17, with it usually being preferable to ground the anode terminal for safety and instrumentation reasons. Pulse generator 19 employed to supply pulses to pulser 18 will be discussed at greater length hereinafter.

When the pulses thus generated arrive at the cathode, electrons are caused to be emitted from its metallic surface and form a free electron cloud in the gas space surrounding the cathode. Under the influence of the applied electric field the electrons in the cloud are accelerated down the length of the gas tube, colliding in the process with atoms of the gas.

Figure 3:
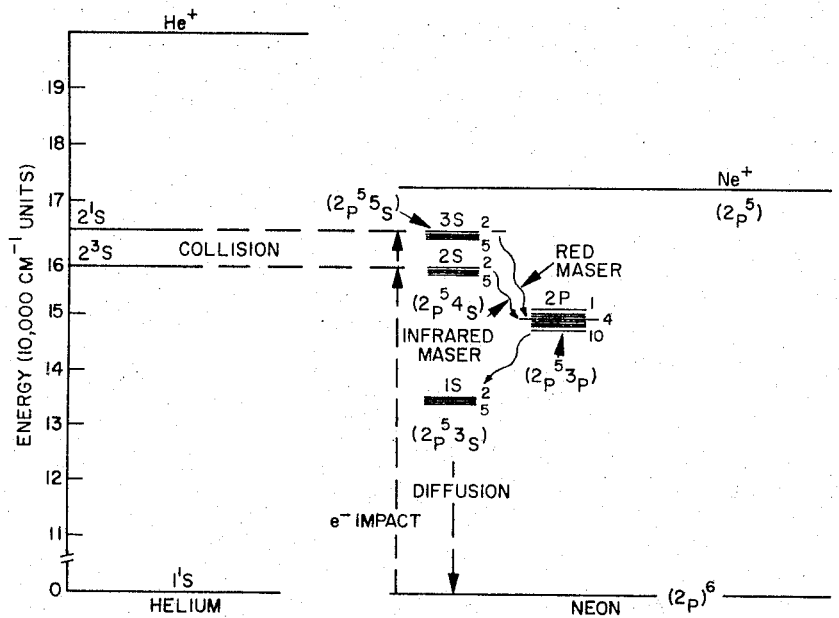
FIGURE 3 is an energy level diagram of helium and neon atoms.

When such an electron impacts with a helium gas atom, the energy level of the atom may be raised to the $2^3S$ level. The $2^3S$ level of helium is a metastable level of long natural lifetime. A number of helium atoms at this level suffer inelastic collisions with neon atoms at the ground state, with high probability of raising such neon atoms to the neon $2s_2$ level, thus creating a population inversion of this level over the $2p_4$ level. Some of the $2s_2$ atoms will spontaneously drop to the $2p_4$ level, as indicated in FIGURE 3, emitting radiation at a wavelength of 1.15 microns (11530 A.). This radiation will induce the rest of the inverted population to drop down to the $2p_4$ level, releasing radiative energy coherent with this exciting radiation. This energy is reflected back and forth by the highly reflective mirrors, thus inducing even more $2s_2$ atoms to react in a similar manner.

The energy gained on each passage through the gas tube is greater than that lost so that the system operates in a regenerative manner, acting as the optical analog of an electrical oscillator. A small amount of the energy incident on the mirrors is transmitted through them rather than reflected, and it is this energy that is utilized for practical application.

The output power is heavily dependent on the degree of the $2s_2$–$2p_4$ population inversion; that is, the ratio of $2s_2$ atoms to $2p_4$ atoms. When the system is in its quiescent condition neither level is significantly populated. In the time interval immediately following the application of an exciting voltage, the $2s_2$ level becomes heavily populated, but as spontaneous and induced emission occurs, the population of the $2p_4$ level ordinarily increases until the population inversion is not sufficient to achieve a power gain greater than the power losses, the laser action—that is, the regenerative oscillation—ceases. This invention, in which the gas discharge is excited with a short, intense field rather than a CW field, causes this large population inversion to occur immediately after the initiation of the field, and by doing so produces a significantly larger power output than is obtained by existing methods. The excited levels are allowed to decay to the ground state before the next pulse is applied, so that the optical output consists of a series of short, intense pulses.

It should be noted that the detected output pulses of our device are significantly longer than the high voltage pulses applied to the cathode. The shape of the output pulses resembles that given by Benton et al. in the article "Cross Section for the D-excitation of Helium Metastable Atoms by Collision With Atoms," Physical Review 128, 206 (1962). Such longer duration arises from the fact that while the electron flow from the cathode terminates as soon as the applied electing field collapses, the laser output pulse continues because the stimulated emission from the inverted population decays at a rate dependent upon the rate at which the inverted population of the neon $2s_2$ level returns to the $2p_4$ level.

A pulsed laser in accordance with this invention requires a relaxation time between pulses in order for the gas in the laser cavity to respond in a desired way to the next pulse. This relaxation time may be described for a cylindrical laser tube by the equation $$\frac{1}{\tau} = \frac{\Lambda^2 P}{D} \qquad (7)$$

where $\tau$ = Relaxation time
$\Lambda$ = Diffusion length
$P$ = Gas pressure
$D$ = Diffusion coefficient This diffusion effect contrasts with that in the CW laser where one can write a diffusion depend gain equation as $$G \alpha \frac{1}{R} \qquad (8)$$

where $G$ = Gain per unit length
$R$ = Radius of cylinder

Equation 8, which is recognized by authorities in the field, is not applicable to our invention.

Figure 4:
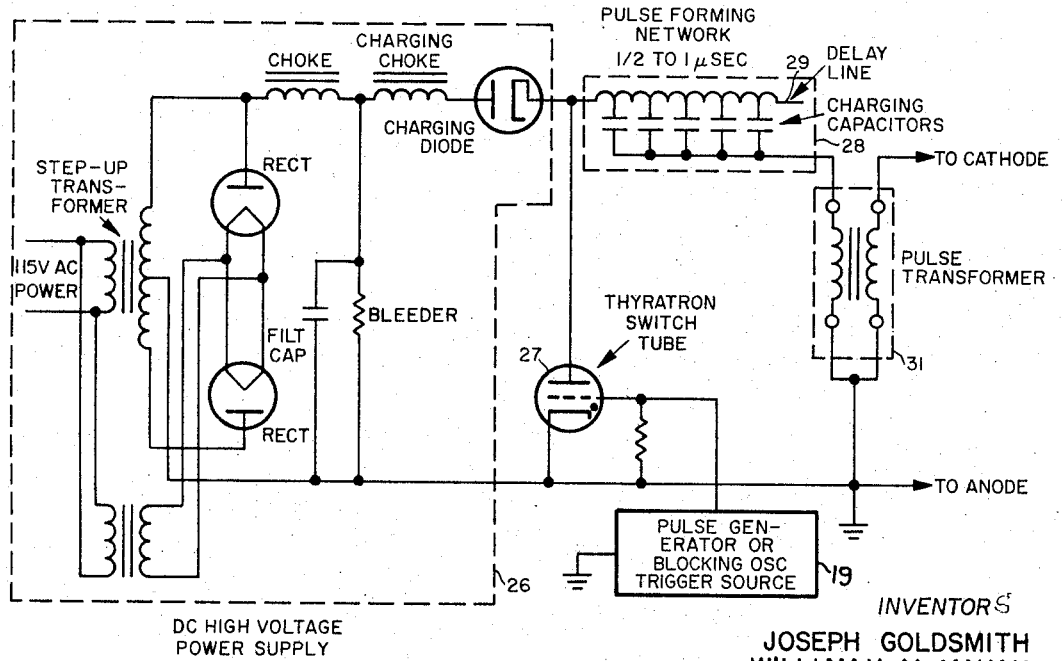
FIGURE 4 is a schematic diagram illustrating an arrangement by which high voltage pulses to be supplied to the cathode may be generated.

The high voltage pulser 18 used to supply short duration, high voltage pulses to our laser unit may assume any of several forms. One preferred configuration, shown in FIGURE 4, consists of a high voltage DC power supply 26, a switch such as a thyratron 27, capacitors 28 capable of being charged to a high voltage, which can subsequently be discharged into a pulse-forming delay line 29. The pulse output of the delay line can be further stepped up to a higher voltage by means of a pulse transformer 31, thereby producing a unidirectional, short, square wave type pulse suitable for connection to the cathode 16 for the excitation of the laser in conformance with the principles previously discussed. This pulse development procedure can be produced in a repetitive fashion by periodically actuating the switch device at a given rate. For example, a blocking oscillator 19 or a more sophisticated pulse generator may be employed for repetitively actuating the thyratron switch. The constants or values for these components of the high voltage source must be consistent with the voltage pulse rise time, pulse width, charging times, and the like that are required in order to operate our laser in the specific manner this invention demands. The design and construction of our high voltage source are not considered as inventive herein, but nevertheless the output requirements must be specifically tailored to the laser mode of operation.

The amplitude of the high voltage pulse applied to the cathode, as previously mentioned, must be high enough to produce high electron densities in the gas, and while the exact amplitude will be dependent upon the gas pressure, cathode material and cathode shape, the minimum value at which laser action was initiated in the particular configuration described herein was in the order of 11 to 12 thousand volts. The laser output power was known to increase essentially linearly with the applied voltage up to 20,000 volts, which was the limit of the capability of the particular power supply used.

The rise time of the applied high voltage pulses must be short compared to its width in order to produce rapid population inversion. We found that the rise times were in the order of magnitude of a few hundredths of a microsecond. The widths of the pulses is between ½ to one microsecond, and for the specific laser mode of operation herein described probably cannot exceed two or three microseconds if the maximum power and efficiency achievable by this mode of operation is to be accomplished. The recurrence rate of the high voltage pulses was found not to affect the power output significantly when varied from a few cycles per second to several thousand cycles per second. However, theoretical analysis indicates that the upper limit at which pulsing can occur without diminishing of power output will be dependent upon the size of the envelope, the mixture and pressure of the gases, and other such factors. The previously mentioned limitations or values for the high voltage rectangular pulse applied to the laser are specifically dependent upon the quantum mechanical transient response of this type of gas laser and are concerned with such factors as the migration times of electrons in the gas, collision cross sections, transition probabilities, decay times and other interatomic processes.

As should now be apparent, our rapid inversion process is brought about as follows:

A high electric field of short duration is created in the gas tube to bring about electron emission from the cathode. This field in accordance with the present invention is brought about by the use of the high voltage short duration pulses of fast rise time. This field must be sufficiently large that the electrons leaving the cathode obtain sufficient energy to excite a significant number of helium atoms from the ground state to the $2^3S$ level, which is a metastable level. A number of helium atoms at this level suffer inelastic collisions with neon atoms at the ground state, with high probability of raising such neon atoms to the neon $2s_2$ level, thus creating a population inversion of this level over the $2p_4$ level. Some of the $2s_2$ atoms will spontaneously drop to the $2p_4$ level, emitting radiation at a wavelength of 1.15 microns. This radiation will induce the others of the inverted population to drop down to the $2p_4$ level, releasing radiative energy coherent with this exciting radiation. This energy is reflected back and forth by highly reflective mirrors 14 and 15, thus inducing even more $2s_2$ atoms to react in a similar manner.

The energy gained on each passage through the gas tube is greater than that lost so that the system operates in a regenerative manner, with a small amount of the energy incident on the mirrors transmitted through them rather than reflected, which of course is the energy utilized for practical application.

The primary embodiment of this invention utilizes a mixture of helium and neon of the pressure and in the ratio indicated in Table I by the $2s_2$ to $2p_4$ transition, but other helium-neon transitions set forth in this table are theoretically possible utilizing our rapid inversion technique.

TABLE I.—HELIUM-NEON GAS

| Wave length in air ($\mu$) | Transition (LS or Paschen) | Optimum Pressure (mm. Hg) | Gain $\Delta I/I$ (percent/m) | Power (mw. per beam) |
|---|---|---|---|---|
| 0.6328 | $3s_2$–$2p_4$ | $P_{He}=0.5$, $P_{Ne}=0.1$ | 2 | 4 |
| 1.1523 | $2s_2$–$2p_4$ | $P_{He}=1$, $P_{Ne}=0.1$ | 12 | 20 |
| 1.1614 | $2s_3$–$2p_5$ | $P_{He}=1$ to 2, $P_{Ne}=0.1$ to .2 | 2 | 1 |
| 1.5231 | $2s_2$–$2p_1$ | $P_{He}=0.5$, $P_{Ne}=0.1$ | 6 | 3 |
| 3.3913 | $3s_2$–$3p_4$ | | $1.6 \times 10_4$ | 10 |

Indeed, our principle is not limited to only mixtures of helium and neon, and other gases or gas mixtures which may be suitable for use in accordance with our invention are tabulated in Table II.

TABLE II

| Cesium | Helium | Xenon |
| Neon-oxygen | Argon | Helium-xenon |
| Argon-oxygen | Krypton | Neon |

Each of these tables was taken from tabled information set forth in the Applied Optics supplement on Optical Masers (1962), wherein the article entitled "Gaseous Optical Masers" by W. R. Bennett, Jr. sets forth on Page 38 a table of information on these and other transitions. Table II above is not necessarily an inclusive listing of gases that can be utilized in accordance with our rapid inversion technique.

As will be obvious to one skilled in the art, the mirrors employed to create the optically resonant cavity must be designed to be highly reflective at the particular wavelength involved in the transition employed, so depending upon the transition used, the mirrors will be peaked accordingly.

While we have described the principal embodiment of my invention as employing a cold cathode from which electrons are emitted by gamma processes and field emission, it must be realized that we are not to be so limited. For example the electrons may be supplied by a hot cathode, which of course gives off electrons by thermionic emission, or the electrons may be given off as a result of ultraviolet light impinging upon a cold cathode, thereby bringing about photoelectric emissions of electrons.

Our invention is capable of a considerable breadth of utilization, and we are not to be limited to the embodiments shown except as required by the scope of the appended claims.

We claim:

1. A high efficiency pulsed gas laser for producing a pulsed output of coherent electromagnetic energy having a peak power output substantially greater than that of a continuous wave laser, comprising a gas tube containing a lasable gas possessing two energy levels between which lasing can occur, and having partially reflective usrfaces adjacent the ends of the tube, aligned so as to define an optically resonant cavity spaced cathode and anode electrodes disposed in operative relation to said tube, and means for supplying high voltage, short duration pulses to said electrodes thereby to produce a free electron density in said gas, such electrons being accelerated in the field generated by said high voltage pulses, said pulses having a fast rise time and a duration less than the diffusion time of the free electrons from cathode to anode under the influence of said field to bring about a population of the upper laser level of said gas from which stimulated emission can take place as long as the lower laser level of said gas has not become significantly populated, such radiative emission in said resonant cavity growing by coherent amplification and escaping from said cavity through said partially reflective surfaces as a pulsed coherent beam, the high efficiency of the overall lasing process being made possible by the utilization of high voltage pulses of sufficiently short duration as to avoid significant population of said lower laser level.

2. The pulsed gas laser as defined in claim 1 in which said spaced electrodes are extrenal to said tube.

3. The pulsed gas laser as defined in claim 1 in which said spaced electrodes are internal to said tube.

4. The pulsed gas laser as defined in claim 3 in which one of said internal electrodes is a hot cathode.

5. A high efficiency gas laser for producing a pulsed output of coherent electromagnetic energy having a peak power output substantially greater than that of a continuous wave laser, said pulsed gas laser comprising an envelope containing a lasable gas possessing two energy levels between which lasing can occur, spaced cathode and anode electrodes disposed in operative relation to said envelope, partially reflective surfaces disposed adjacent the ends of said envelope and aligned so as to provide an optically resonant cavity, means for supplying high voltage, short duration pulses to said electrodes, thereby to produce a free electron density in said gas, such electrons being accelerated in the field generated by said high voltage pulses, said pulses having a duration less than the diffusion time of the free electrons from cathode to anode under the influence of said field to bring about a population of the upper laser level of said gas from which the population can decay to the lower laser level by stimulated emission, such emission taking place as long as the lower laser level of said gas has not become significantly populated, such radiative emission in said resonant cavity growing by coherent amplification and escaping from said cavity through said partially reflective surface as a pulsed coherent beam, the efficiency of the overall lasing process being maximized by the selection of high voltage pulses of sufficiently short duration as to avoid significant population of said lower laser level.

6. The pulsed gas laser as defined in claim 5 in which said electrodes are external ot said envelope.

7. The pulsed gas laser as defined in claim 5 in which said electrodes are internal to said envelope.

8. The pulsed gas laser as defined in claim 7 in which one of said internal electrodes is a hot cathode.

References Cited

Boots et al.: "Pulsed Gaseous Maser," Nature, vol. 197, No. 4863, Jan. 12, 1963, pp. 173–174, Q 1 N2.

Ryder: Electronic Fundamentals AND Applications, J. D. Ryder, Prentice-Hall, 2nd edition, 1959, pp. 72, 81, and 82 relied upon.

Sanders: "Optical Maser Design," Physical Review Letters, vol. 3, No. 2, July 15, 1959, pp. 86–87.

JEWELL H. PEDERSEN, *Primary Examiner.*

RONALD L. WIBERT, *Examiner.*